US008660678B1

(12) United States Patent
Lavi et al.

(10) Patent No.: US 8,660,678 B1
(45) Date of Patent: Feb. 25, 2014

(54) AUTOMATIC SCORE FOLLOWING

(75) Inventors: Yair Lavi, Ra'anana (IL); Evgeni Begelfor, Rehovot (IL)

(73) Assignee: Tonara Ltd., Ramat Gan (IL)

( * ) Notice: Subject to any disclaimer, the term of this patent is extended or adjusted under 35 U.S.C. 154(b) by 1024 days.

(21) Appl. No.: 12/705,631

(22) Filed: Feb. 15, 2010

Related U.S. Application Data

(60) Provisional application No. 61/153,243, filed on Feb. 17, 2009.

(51) Int. Cl.
*G06F 17/00* (2006.01)

(52) U.S. Cl.
USPC .......... 700/94

(58) Field of Classification Search
USPC .......... 700/94; 84/612, 609
See application file for complete search history.

(56) References Cited

U.S. PATENT DOCUMENTS 5,913,259 A * 6/1999 Grubb et al. .......... 84/610
6,185,528 B1 * 2/2001 Fissore et al. .......... 704/232
6,380,474 B2 * 4/2002 Taruguchi et al. .......... 84/612
6,504,089 B1 * 1/2003 Negishi et al. .......... 84/609
7,579,541 B2 * 8/2009 Guldi .......... 84/470 R
2001/0023635 A1 * 9/2001 Taruguchi et al. .......... 84/609
2001/0054347 A1 * 12/2001 Uehara .......... 84/477 R
2002/0181711 A1 * 12/2002 Logan et al. .......... 381/1
2004/0231498 A1 * 11/2004 Li et al. .......... 84/634
2008/0053295 A1 * 3/2008 Goto et al. .......... 84/616
2008/0300702 A1 * 12/2008 Gomez et al. .......... 700/94

FOREIGN PATENT DOCUMENTS

JP 2001117580 A * 4/2001 .......... G10L 15/10
JP 2002251198 A * 9/2002 .......... G10L 15/14

OTHER PUBLICATIONS

Alex R et al. (JP 2001117580 A), AIPN Machine Translation.*
Yao, Kaishen et al. (JP 2002251198 A), AIPN Machine Translation.*
Jordanous, A., "Score Following: Artificially Intelligent Musical Accompaniment", University of Sussex, 2008.
Doucet et al., "A Tutorial on Particle Filtering and Smoothing: Fifteen Years Later", Handbook of Nonlinear Filtering, Oxford University Press, version 1.1., Dec. 2008.

* cited by examiner

*Primary Examiner* — Vivian Chin
*Assistant Examiner* — Leonard M Giannone
(74) *Attorney, Agent, or Firm* — D. Kligler IP Services Ltd.

(57) ABSTRACT

A method for audio processing includes receiving in an electronic processor an audio input from a performance of a musical piece having a score. A two-dimensional state space is defined, including coordinates modeling the performance, each coordinate corresponding to a respective location in the score and a tempo of the performance. For each of a plurality of times during the performance, a probability distribution is computed over the two-dimensional state space based on the audio input. Based on the probability distribution, the performance is matched to the score.

15 Claims, 3 Drawing Sheets

AUTOMATIC SCORE FOLLOWING

CROSS-REFERENCE TO RELATED APPLICATION

This application claims the benefit of U.S. Provisional Patent Application 61/153,243, filed Feb. 17, 2009, which is incorporated herein by reference.

FIELD OF THE INVENTION

The present invention relates generally to computerized processing of audio signals, and specifically to methods and apparatus for analyzing music as it is performed.

BACKGROUND OF THE INVENTION

A variety of methods for computerized score following have developed over the past few decades. "Score following," in the context of the present patent application, means analyzing, in real-time, audio input resulting from a performance of a piece of music, and automatically tracking the corresponding location in the musical score of the piece. (The term "audio input," as used in the context of the present patent application and in the claims should be understood broadly to encompass any and all forms of audio signals, including digital audio data signals, such as Musical Instrument Digital Interface (MIDI) data streams.) Reliable score following is complicated by the fact that performers often change tempo, make mistakes, or otherwise play the music not exactly as it is written.

Various methods of score following have been described in the patent literature. For example, U.S. Pat. No. 5,913,259, whose disclosure is incorporated herein by reference, describes a computer-implemented method for stochastic score following. The method includes the step of calculating a probability function over a score based on at least one observation extracted from a performance signal. The most likely position in the score is determined based on the calculating step.

Some recent efforts in score following have focused on the use of Hidden Markov Models (HMMs). A HMM is a statistical model in which the system being modeled—in this case, the performance of a musical piece—is taken to be a Markov process with states that are not directly observable ("hidden"), but which give an observable output. A probabilistic analysis is applied to the observed output in order to infer the sequence of states traversed by the system. Jordanous recently surveyed the application of HMMs to score following in a presentation entitled "Score Following: Artificially Intelligent Musical Accompaniment" (University of Sussex, 2008), which is incorporated herein by reference.

SUMMARY

Embodiments of the present invention that are described hereinbelow provide novel methods and systems for score following with enhanced reliability, even in the presence of musical errors and noise.

There is therefore provided, in accordance with an embodiment of the present invention, a method for audio processing, including receiving in an electronic processor an audio input from a performance of a musical piece having a score. A two-dimensional state space is defined, including coordinates modeling the performance. Each coordinate corresponds to a respective location in the score and a tempo of the performance. For each of a plurality of times during the performance, a probability distribution is computed over the two-dimensional state space based on the audio input. Based on the probability distribution, the performance is matched to the score.

In some embodiments, matching the performance to the score includes outputting an indication of the location on a display of the score. Alternatively or additionally, when the score includes multiple pages, matching the performance to the score may include automatically turning the pages of the score on a display during the performance responsively to the location in the score. Further alternatively or additionally, the method may include automatically generating an accompaniment to the performance based on the location and the tempo.

In an alternative embodiment, matching the performance to the score includes evaluating a match of the performance to scores of multiple musical pieces concurrently, and generating an indication of the musical piece that is being performed from among the multiple musical pieces.

In a disclosed embodiment, computing the probability distribution includes applying a Hidden Markov Model (HMM) having observable states corresponding to the audio input and hidden states corresponding to the location and the tempo. Typically, applying the HMM includes defining a set of particles having respective coordinates in the state space and weights, and iteratively applying a particle filtering process to decode the HMM using the weights.

There is also provided, in accordance with an embodiment of the present invention, audio processing apparatus, including an input device, which is configured to provide an audio input from a performance of a musical piece having a score. A processor is configured to process the audio input using a two-dimensional state space including coordinates modeling the performance, each coordinate corresponding to a respective location in the score and a tempo of the performance at the location, such that for each of a plurality of times during the performance, the processor computes a probability distribution over the two-dimensional state space based on the audio input and matches the performance to the score based on the probability distribution.

There is additionally provided, in accordance with an embodiment of the present invention, a computer software product, including a tangible computer-readable medium in which program instructions are stored, which instructions, when read by a processor, cause the processor to receive an audio input from a performance of a musical piece having a score, and to process the audio input using a two-dimensional state space including coordinates modeling the performance, each coordinate corresponding to a respective location in the score and a tempo of the performance at the location, such that for each of a plurality of times during the performance, the processor computes a probability distribution over the two-dimensional state space based on the audio input and matches the performance to the score based on the probability distribution.

The present invention will be more fully understood from the following detailed description of the embodiments thereof, taken together with the drawings in which:

DETAILED DESCRIPTION OF EMBODIMENTS

Overview

Automatic score following systems that are known in the art suffer from poor robustness, particularly in the face of quick tempo changes and mistakes made by the performer. The problems are exacerbated when these systems are confronted with polyphonic audio input—including chords and/or multiple instruments played together—and audio interference. Embodiments of the present invention that are described hereinbelow overcome these shortcomings by taking a novel probabilistic approach in analysis of performed music.

The present approach uses a two-dimensional state space to model the played music, with coordinates that correspond to both the location of the performance in the score at any given time and the tempo of playing the piece at that time. In other words, the tempo is not just determined as a result of finding the notes that are played and their relative timing, but rather is used itself as a state variable in determining which notes have been played. The electronic processor that carries out the score following computation calculates a probability distribution over the two-dimensional state space, based on the audio input, at multiple, successive points in time during the performance. It uses this probability distribution in matching the performance to the score. The processor thus determines, as the piece is played, both the current location of the performance—i.e., which notes in the score are being played—and the current tempo.

The inventors have found that the use of this sort of two-dimensional state space achieves more accurate and robust score following than probabilistic methods that are known in the art. The processor is able to work directly from the audio input (analog or digital) and the score, without prior learning or pre-processing of recordings of the musical piece in question. In some embodiments, the processor generates musical accompaniment for the performer automatically based on the score following results.

In some embodiments, the processor matches the performance to the score using a Hidden Markov Model (HMM), with observable states corresponding to the audio input and hidden states corresponding to the location and the tempo. To decode the HMM and find the hidden states, the processor applies a particle filtering process, using a set of particles having respective coordinates in the state space, i.e., each particle corresponds to a certain location and a certain tempo. The location coordinates do not necessarily correspond to the actual discrete notes in the score and may assume continuous values. The particle filtering process uses a sequential Monte Carlo method to iteratively compute respective probability weights of the particles. The processor takes a weighted sum over the particles in order to find the best estimate of the location and tempo at any given time.

System Description

Figure 1:
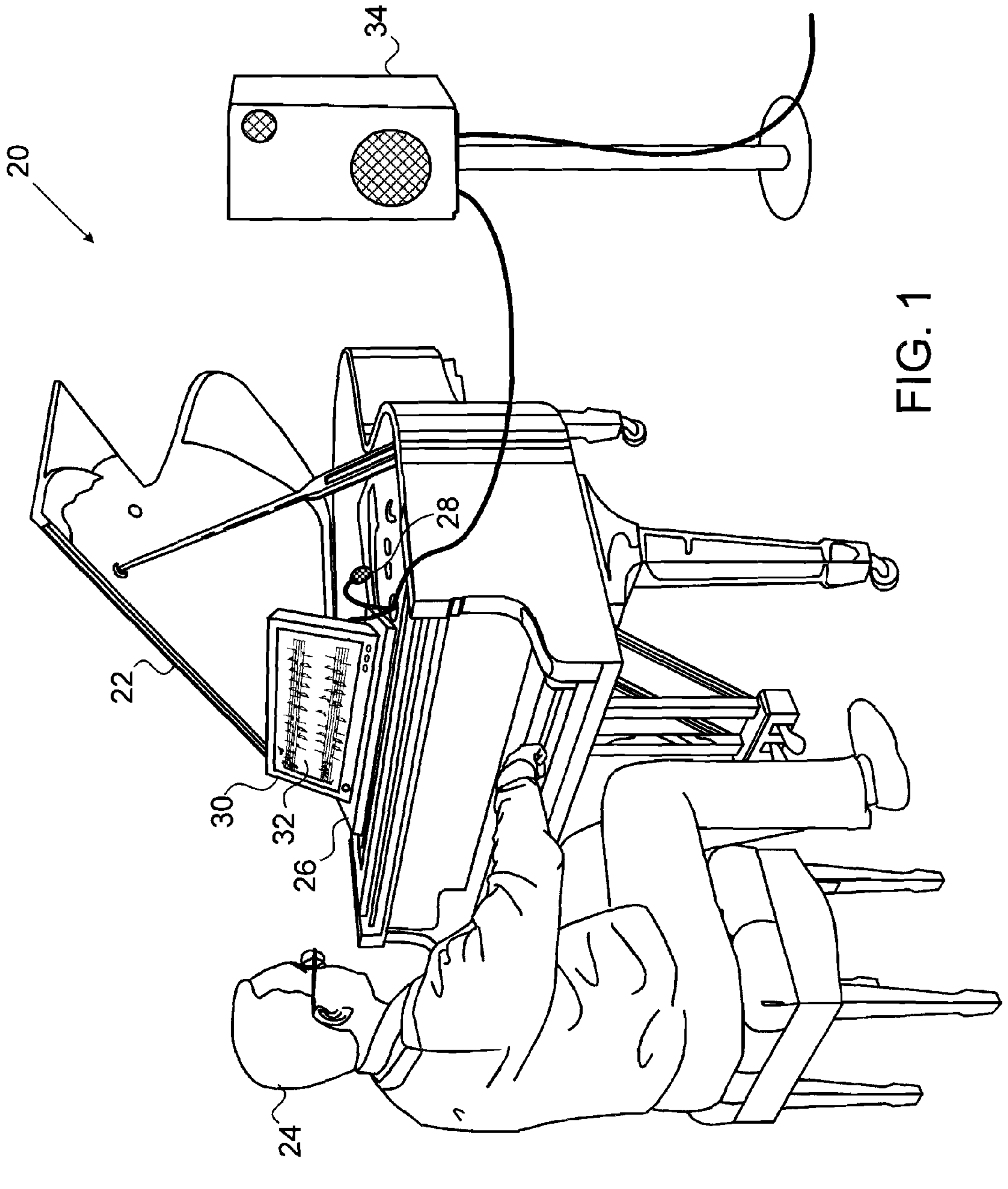
FIG. 1 is a schematic, pictorial illustration of a score following system, in accordance with an embodiment of the present invention.

FIG. 1 is a schematic, pictorial illustration of a score following system 20, in accordance with an embodiment of the present invention. In the pictured embodiment, a performer 24 plays a musical instrument 22, such as a piano. The piano is inherently polyphonic, since the performer typically plays multi-note chords. Alternatively, system 20 may be used with monophonic or other polyphonic instruments, as well as with ensemble and even orchestral pieces. Further alternatively, system 20 may carry out score following of vocal music.

An electronic processor 26 receives an audio input from the performance via an input device 28, such as a microphone. Alternatively, the input may be in digital form, such as a MIDI or other data stream, in which case the input device may simply comprise a digital input port. The processor matches the performance to a score stored in memory (FIG. 2) in order to determine the current location of the performance in the score, as well as the tempo. The processor may present the score on a display 30, and may optionally present a cursor on the display screen indicating the current location. Additionally or alternatively, the processor may automatically turn the pages of the score on the display during the performance, thus relieving the performer of this burden.

Further alternatively or additionally, processor 26 may automatically generate a suitable accompaniment to the performance, based on the computed location and the tempo. The accompaniment may be output via an audio output device, such as a speaker 34, connected to the processor. Alternatively, the accompaniment may be generated by a separate synthesizer (not shown), based on the indications of the location in the score and the tempo that are provided by the processor.

As yet another alternative, processor 26 may allow the performer to browse over a library of multiple musical pieces in order to identify the piece that the performer is currently playing. For this purpose, the processor concurrently matches the performance against multiple scores in the library, and then outputs an identification of the musical piece that best matches the performance. This functionality, for example, can enable the performer to find the complete score of a piece that he or she remembers only a part of.

Other possible applications of system 20 are described in the above-mentioned provisional patent application.

Figure 2:
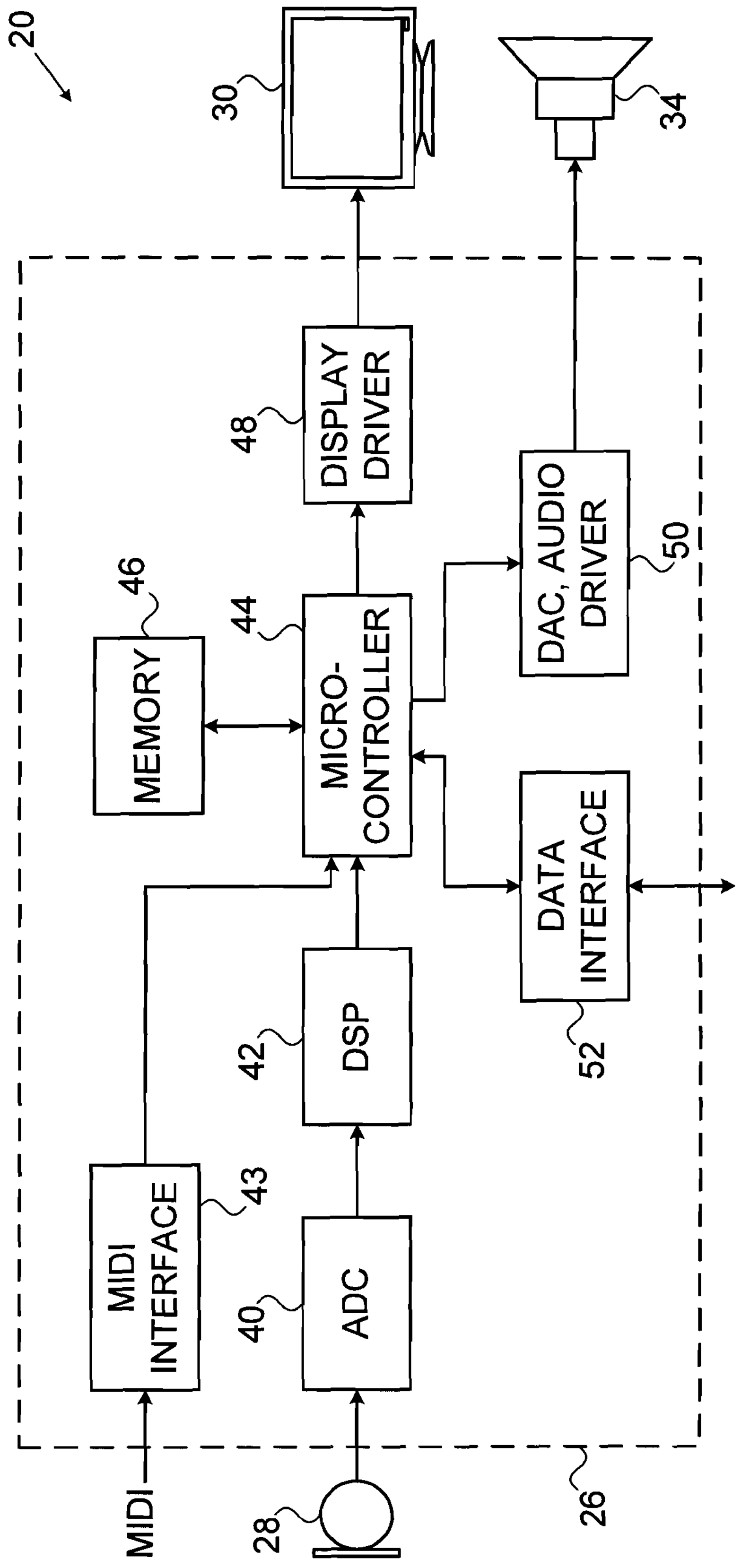
FIG. 2 is a block diagram that schematically shows functional elements of a score following system, in accordance with an embodiment of the present invention.

FIG. 2 is a block diagram that schematically shows functional elements of system 20, and specifically of processor 26, in accordance with an embodiment of the present invention. Although microphone 28, display 30 and speaker 34 are optional parts of the system, they are shown in the figures for the sake of completeness. The elements of processor 26 are shown here by way of illustration, and the principles of the present invention may similarly be applied using processors in other hardware configurations, as are known in the art. For example, processor 26 may comprise a general-purpose computer (with a suitable input interface), which is programmed in software to carry out the methods that are described herein. This software may be downloaded to the computer in electronic form, over a network, for example. Alternatively or additionally, the software may be stored in a tangible computer-readable medium, such as optical, magnetic, or electronic memory media.

In the pictured embodiment, the audio signal from microphone 28 is digitized by an analog-to-digital converter (ADC) 40, which may include an automatic gain control (AGC) circuit. ADC 40 outputs a stream of digital audio samples to a digital signal processor (DSP) 42, which transforms the time-domain samples to the frequency domain. For example, the DSP may apply a Discrete Fourier Transform (DFT) to the sequence of audio samples in order to generate a stream of frequency-domain samples, quantized to fit the expected range of notes played on instrument 22. Alternatively, processor 26 may receive a MIDI input via a MIDI interface 43. In this case, the frequency-domain samples may be equal to the MIDI velocities of the corresponding pitches in the MIDI input.

A microcontroller 44 processes the frequency-domain samples using a HMM with a two-dimensional state space, as described in detail hereinbelow. (Alternatively, the microcontroller may receive the time-domain samples and perform the DFT itself, thus obviating the separate DSP.) The microcontroller may comprise a general-purpose microprocessor, which executes suitable software stored in a memory 46. Alternatively or additionally, the microcontroller may comprise dedicated or programmable hardware logic circuits. Memory 46 may comprise non-volatile memory (such as ROM or flash memory) or volatile RAM or both. Microcontroller 44 decodes the HMM in order to match the audio input from instrument 22 to a score stored in memory 46. The microcontroller thus generates an indication of the current location of the performance relative to the score, as well as of the current tempo.

As noted above, microcontroller 44 may perform a variety of functions based on this score following. For example, the microcontroller may instruct a display driver 48, such as a computer graphics device, to present the score on display 30, including the cursor movement and page-turning functions described above. Alternatively or additionally, the microcontroller may instruct an audio driver 50 to play an appropriate accompaniment via speaker 34. (Typically, driver 50 comprises a digital-to-analog converter (DAC) for generating the required analog input to the speaker.) Further alternatively or additionally, the microcontroller may output the indication of the current location in the score (and possibly the tempo) via a data interface 52, such as a Universal Serial Bus (USB) interface. The microcontroller may also use interface 52 to access data, such as a library of musical scores, in an external memory (not shown).

Method for Score Following

As noted earlier, in performing the score following functions described above, processor 26 builds a HMM with a two-dimensional state space and uses a particle filter to decode the HMM and thus to match the performance to the score. Particle filters and their application to HMMs are described, for example, by Doucet and Johansen in "A Tutorial on Particle Filtering and Smoothing: Fifteen Years Later," Handbook of Nonlinear Filtering (Oxford University Press, 2008), which is incorporated herein by reference.

The HMM used by processor 26 comprises a Markov chain $X_0, X_1, \ldots, X_n$ (wherein the $X_i$'s are the hidden variables, or states) and a set of successive observable variables $Y_0, Y_1, \ldots, Y_n$. The observable variables correspond to the samples of the audio input and/or to MIDI event inputs. The hidden variables have the form $X_n=(L_n,\alpha_n)$, wherein $L_n$ is the continuous location in the score at time n; $\alpha_n$ is the tempo at time n; and n is a discrete time-count index, measured in time steps that are typically smaller than the time between notes in the score. $L_n$ is measured in Absolute Piece Time units (APTU). For example, if a music piece starts with two whole notes followed by a half note, and $L_n=2.25$ APTU, then $L_n$ represents the middle of the third note in the piece. $\alpha_n$ is the momentary speed of play, measured in units of APTU per time-step.

As explained above, processor 26 transforms the input samples represented by $Y_0, Y_1, \ldots, Y_n$ into a sequence of frequency-domain samples defined as $U_0, U_1, \ldots, U_n$. Each $U_i$ is a vector of coefficients corresponding to the audio frequency components at time n. The elements of the vector may be defined to correspond to the frequencies of the notes that may be output by instrument 22.

The hidden and observable variables in the HMM are related by two sets of probability functions: the observation probability function $P(Y_n|X_n)$, which indicates the probability of receiving output $Y_n$ for a given value $X_n$ of the hidden variable; and the state transition probability function $P(X_{n+1}|X_n)$, from state $X_n$ to state $X_{n+1}$ in the Markov chain. Processor 26 computes these probabilities as follows:

$$P(Y_n \mid X_n) = \frac{1}{C\|U_{ref}\|_1}\langle U_n, U_{ref}\rangle \quad (1)$$

Here C is a normalization constant, and < > represents the regular inner product of the vectors. $U_{ref}$ is a reference frequency vector representing the actual note or notes at position $L_n$ in the score that is being followed. The reference vector of a single note can either be sampled from instrument 22 (or from another reference instrument), or it can be modeled. The reference frequency vector of several notes together is the sum of their references frequency vectors.

$$\begin{aligned} P(X_{n+1} \mid X_n) &= P((L_{n+1}, \alpha_{n+1}) \mid (L_n, \alpha_n)) \\ &= X(L_n + \alpha_n, \sigma_1) * N(\alpha_n, \sigma_2) \end{aligned} \quad (2)$$

Here $N(\mu,\sigma)$ is the normal distribution with expectancy $\mu$ and standard deviation $\sigma$; and $\sigma_1$ and $\sigma_2$ are configurable parameters, which may be set so as to balance precision of score following against robustness in the face of errors.

Figure 3:
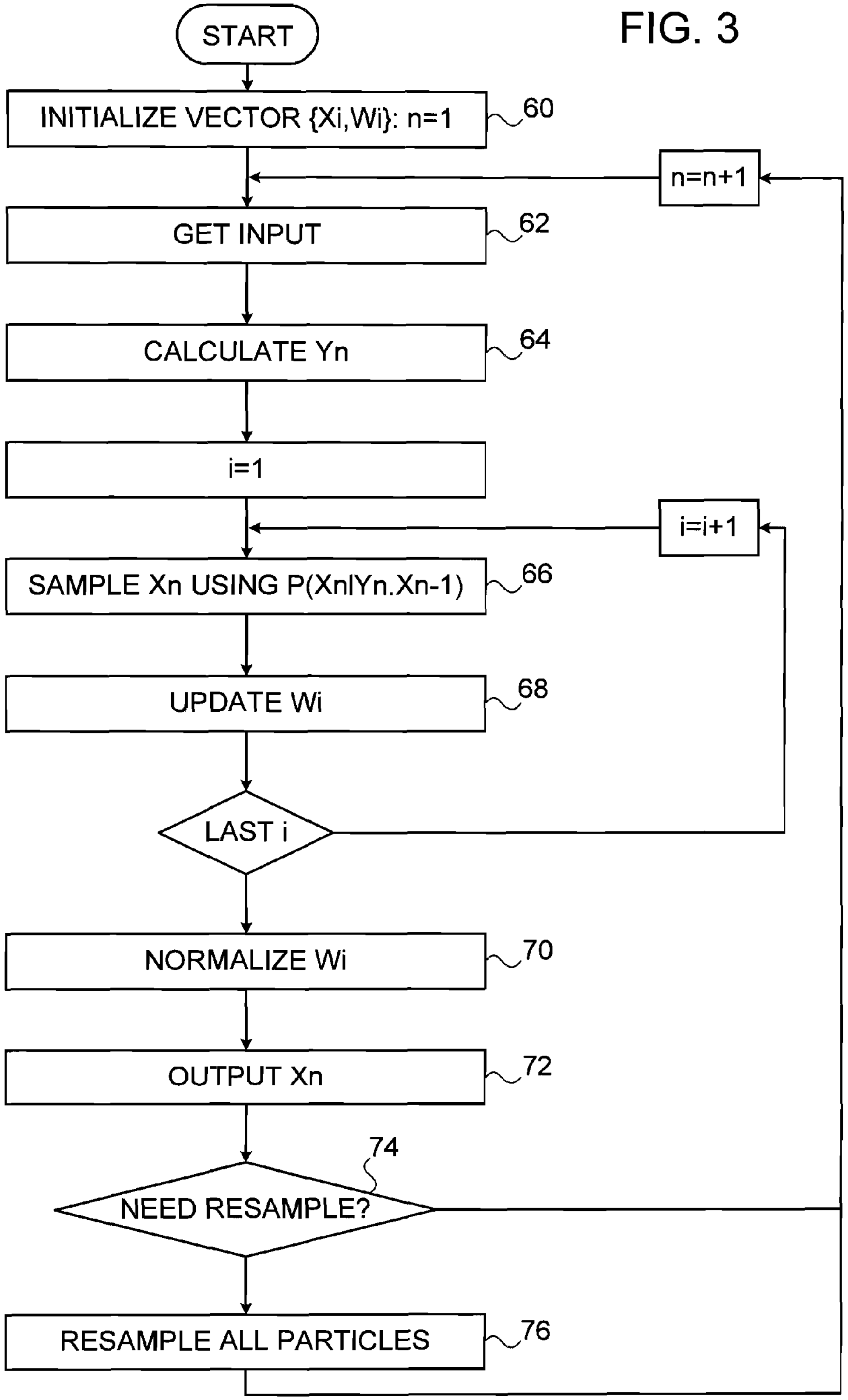
FIG. 3 is a flow chart that schematically illustrates a method for score following, in accordance with an embodiment of the present invention.

FIG. 3 is a flow chart that schematically illustrates a method for score following that uses particle filtering to decode the above HMM, in accordance with an embodiment of the present invention. The method iteratively updates a vector $\{X_i,W_i\}$ representing a set of particles, wherein $X_i$ is the hidden variable defined above, and $W_i$ is a probability measure ("weight") computed for each $X_i$. The weights are normalized so that the sum of all $W_i$ is 1 at any given time increment n.

At the start of the method, processor 26 initializes the vector {Xi,Wi}, at an initialization step 60. The initial values of $L_i$ are chosen to correspond to possible starting positions in the musical piece being played. The tempos $\alpha_i$ are set to an average value or according to a certain statistical distribution. All weights $W_i$ are initially equal, and the time step parameter n is set to 1. The initial vector elements may be fixed in this manner, or they may change from time to time based on accumulated statistics or other criteria.

Processor 26 receives an input, from microphone 28 or from a MIDI device, for example, at an input step 62. This is the first step of an outer loop, which the processor performs for each successive value of n, as will be described below. Based on the input, processor 26 generates digital samples $Y_n$, which are represented in terms of the frequency-domain vector $U_n$, at a sample processing step 64.

The processor then initiates an inner loop, which is performed over all i for the vector of particles $\{X_i,W_i\}_n$. For each i, the processor computes a random sample value $X_i$ for the current value of n using the probability $P(X_n|Y_n,X_{n-1})$, the vector $U_n$, and the sample value of $X_i$ from the previous iteration of the outer loop, at a sampling step 66. The probability $P(X_n|Y_n,X_{n-1})$ is calculated from the HMM model functions $P(X_n|X_{n-1})$ and $P(Y_n|X_n)$, as defined above in equations (1) and (2). The processor updates the weight $W_i$ that is associated with each $X_i$, at a weight update step 68, according to the formula:

$$W_n=P(Y_n|X_{n-1})*W_{n-1} \quad (3)$$

The "update" probability $P(Y_n|X_{n-1})$ in equation (3) is likewise calculated from the HMM model functions $P(X_n|X_{n-1})$ and $P(Y_n|X_n)$ that are defined above. Steps 66 and 68 of the inner loop repeat until the processor reaches the last i, which may typically be on the order of 1000 (although larger or smaller numbers of particles may be used).

After the inner loop has been completed, the weights are normalized so that their total will equal 1, at a normalization step 70. The processor uses the weights and particle values to compute the current value of $X_n=(L_n, \alpha_n)$, at an output step 72:

$$X_n = \sum_i W_i X_i \tag{4}$$

This output indicates the most likely current location in the score and the most likely current tempo.

In each iteration through the outer loop, processor checks whether resampling is needed, at a resample checking step 74. Resampling may be needed if there are some dominant particles with high weights. The processor may determine that resampling is needed, for example, when $\|\{W_i\}\|$ is greater than a certain resample threshold. This threshold is a configurable parameter that may depend on the number of particles. If resampling is not needed, the processor returns to step 62 to receive the next input.

If resampling is needed, processor 26 replaces the current vector {Xi,Wi} with a new vector, at a resampling step 76. The new values $X_i$ are sampled from the current set of $X_i$ values, with probabilities given by the current $W_i$. The new $W_i$ values are all set to be equal. For example, if the current vector is $\{X_1, 0.5; X_2, 0.5; X_3, 0; X_4, 0; \ldots X_{100}, 0\}$, the new vector may then have the form: $\{X_2, X_1, X_2, X_1, X_2, X_2, X_1, X_2, X_1, X_1, X_2, \ldots\}$, wherein each particle has an equal probability to be $X_1$ or $X_2$. All the new weights will be set, in this example, to 0.01. The processor then returns to step 62 to begin the next iteration through the outer loop.

This iterative process continues as long as the input continues, or until the user terminates the process.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for audio processing, comprising:

receiving in an electronic processor an audio input from a performance of a musical piece having a score;

defining a two-dimensional state space comprising coordinates modeling the performance, each coordinate $X_n$ corresponding to a respective location $L_n$ in the score at a time n and a tempo of the performance $\alpha_n$ at time n;

for each of a plurality of times i during the performance, defining a set of particles $\{X_i,W_i\}$ having respective coordinates $X_i=(L_i,\alpha_i)$ in the two-dimensional state space and weights $W_i$ corresponding to respective probabilities of the coordinates;

defining a Hidden Markov Model (HMM) having observable states corresponding to the audio input and hidden states corresponding to the location and the tempo, as specified by the particles;

iteratively computing at the plurality of the times the respective weights $W_i$ of the particles in the two-dimensional state space based on the audio input; and matching the performance to the score by computing, at each of the times, a weighted sum over the particles using the respective weights $W_i$ in order to decode the HMM so as to find a current value of $X_n$, which gives a most likely current location in the score and most likely current tempo.

2. The method according to claim 1, wherein matching the performance to the score comprises outputting an indication of the location on a display of the score.

3. The method according to claim 1, wherein the score comprises multiple pages, and wherein matching the performance to the score comprises automatically turning the pages of the score on a display during the performance responsively to the location in the score.

4. The method according to claim 1, and comprising automatically generating an accompaniment to the performance based on the location and the tempo.

5. The method according to claim 1, wherein matching the performance to the score comprises evaluating a match of the performance to scores of multiple musical pieces concurrently, and generating an indication of the musical piece that is being performed from among the multiple musical pieces.

6. Audio processing apparatus, comprising:

an input device, which is configured to provide an audio input from a performance of a musical piece having a score; and a processor, which is configured to process the audio input using a two-dimensional state space comprising coordinates modeling the performance, each coordinate $X_n$ corresponding to a respective location $L_n$ in the score at a time n and a tempo of the performance $\alpha_n$ at time n at the location, such that for each of a plurality of times i during the performance, a set of particles $\{X_i,W_i\}$ is defined, having respective coordinates $X_i=(L_i,\alpha_i)$ in the two-dimensional state space and weights $W_i$ corresponding to respective probabilities of the coordinates, and a Hidden Markov Model (HMM) is defined, having observable states corresponding to the audio input and hidden states corresponding to the location and the tempo, as specified by the particles, wherein the processor iteratively computes at the plurality of the times the respective weights $W_i$ of the particles in the two-dimensional state space based on the audio input and matches the performance to the score by computing, at each of the times, a weighted sum over the particles using the respective weights $W_i$ in order to decode the HMM so as to find a current value of $X_n$, which gives a most likely current location in the score and most likely current tempo.

7. The apparatus according to claim 6, wherein the processor is configured to output an indication of the location on a display of the score.

8. The apparatus according to claim 6, and comprising a display which is operative to display the score, wherein the score comprises multiple pages, and wherein the processor is configured to drive the display so as to automatically turn the pages of the score during the performance responsively to the location in the score.

9. The apparatus according to claim 6, and comprising an audio output device, wherein the processor is configured to drive the audio output device to automatically generate an accompaniment to the performance based on the location and the tempo.

10. The apparatus according to claim 6, wherein the processor is configured to evaluate a match of the performance to scores of multiple musical pieces concurrently, and to generate an indication of the musical piece that is being performed from among the multiple musical pieces.

11. A computer software product, comprising a non-transitory computer-readable medium in which program instructions are stored, which instructions, when read by a processor, cause the processor to receive an audio input from a performance of a musical piece having a score, and to process the audio input using a two-dimensional state space comprising coordinates modeling the performance, each coordinate $X_n$ corresponding to a respective location $L_n$ in the score at a time n and a tempo of the performance $\alpha_n$ at time n at the location, such that for each of a plurality of times i during the performance, a set of particles $\{X_i,W_i\}$ is defined, having respective coordinates $X_i=(L_i,\alpha_i)$ in the two-dimensional state space and weights $W_i$ corresponding to respective probabilities of the coordinates, and a Hidden Markov Model (HMM) is defined, having observable states corresponding to the audio input and hidden states corresponding to the location and the tempo, as specified by the particles, wherein the instructions cause the processor to iteratively compute $W_i$ at the plurality of the times the respective weights $W_i$ of the particles in the two-dimensional state space based on the audio input and to match the performance to the score by computing, at each of the times, a weighted sum over the particles using the respective weights $W_i$ in order to decode the HMM so as to find a current value of $X_n$, which gives a most likely current location in the score and most likely current tempo.

12. The product according to claim 11, wherein the instructions cause the processor to output an indication of the location on a display of the score.

13. The product according to claim 12, wherein the score comprises multiple pages, and wherein the instructions cause the processor to drive a display to display the score and to automatically turn the pages of the score during the performance responsively to the location in the score.

14. The product according to claim 12, wherein the instructions cause the processor to drive an audio output device to automatically generate an accompaniment to the performance based on the location and the tempo.

15. The product according to claim 12, wherein the instructions cause the processor to evaluate a match of the performance to scores of multiple musical pieces concurrently, and to generate an indication of the musical piece that is being performed from among the multiple musical pieces.

* * * * *